United States Patent
Miller et al.

(10) Patent No.: US 9,563,478 B1
(45) Date of Patent: Feb. 7, 2017

(54) SCALABLE CONCURRENT EXECUTION OF DISTRIBUTED WORKFLOWS SHARING COMMON OPERATIONS

(71) Applicant: VMware, Inc., Palo Alto, CA (US)

(72) Inventors: Swaha Miller, Palo Alto, CA (US); Aleksey Pershin, Fremont, CA (US); Michael Kolechkin, Palo Alto, CA (US); Victor Golosovker, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/839,887

(22) Filed: Aug. 28, 2015

(51) Int. Cl.
*G06F 9/46* (2006.01)
*G06F 9/50* (2006.01)

(52) U.S. Cl.
CPC ................... *G06F 9/5038* (2013.01)

(58) Field of Classification Search
None
See application file for complete search history.

(56) References Cited

U.S. PATENT DOCUMENTS

| 7,840,857 B2 * | 11/2010 | Breiter | G06F 11/0709 |
| | | | 714/48 |
| 2010/0217931 A1 * | 8/2010 | Beaman | G06F 11/1471 |
| | | | 711/114 |

* cited by examiner

*Primary Examiner* — Craig Dorais

(57) ABSTRACT

Examples perform concurrent execution of distributed workflows sharing common operations by a plurality of nodes, such as execution of recovery plans for disaster recovery of virtual machines operating on and off premises. Concurrent execution of identical operations that were part of a previously executed workflow are prevented, by evaluating the source of the workflow and whether the workflow has previously been initiated by that source. The disclosure is scalable to allow for new nodes to be included.

20 Claims, 11 Drawing Sheets

US 9,563,478 B1

SCALABLE CONCURRENT EXECUTION OF DISTRIBUTED WORKFLOWS SHARING COMMON OPERATIONS

BACKGROUND

Some existing systems execute concurrent workflows on distributed nodes with shared operations between the workflows. For example, disaster recovery of virtual machines (VMs) operating in cloud environments requires a high level of coordination between nodes which do not have direct knowledge of the existence or state of the other nodes associated with the workflow. A synchronization mechanism allows for mutual exclusion on any shared operations.

Some existing solutions utilize lock-based synchronization to effectuate the execution of concurrent workflows on distributed nodes with shared operations; however, it is difficult for a lock-based synchronization system to respond to dynamic scaling of concurrency when new nodes are added. For example, some of the existing lock-based synchronization systems are a bottleneck for scalability and are undesirable in a distributed cloud environment. Another existing approach is to replicate the processing functions, and to use protocols for achieving consensus between processors on a network of unreliable communication channels. However, that method sometimes results in failing over the same VM multiple times which is not acceptable for disaster recovery workflows.

SUMMARY

One or more examples described herein perform concurrent execution of a plurality of distributed workflows, including workflow templates, by a cluster of management nodes. Execution includes receiving, by one of the cluster of management nodes, one of a plurality of workflow templates and a recovery plan. The management node generates an initiator identifier (ID) associated with the current execution of the workflow. The same Initiator ID is associated with each operation in an execution of the workflow. The management node passes the Initiator ID to an intermediate node along with the request to execute a workflow operation on an object in the recovery plan. Execution further includes performing, upon a plurality of objects, the plurality of operations in the workflow template associated with the objects for the accessed at least one of the plurality of workflow templates. Upon failure of an operation, if the failed operation was previously performed, the Initiator ID of the previous execution of the operation is compared to the Initiator ID of the current execution of the operation. If the recovery plan of the current execution of the operation matches the recovery plan of the previous execution of the operation, the subsequent operations in the received workflow are performed; otherwise, the received workflow is terminated or modified to skip certain operations.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
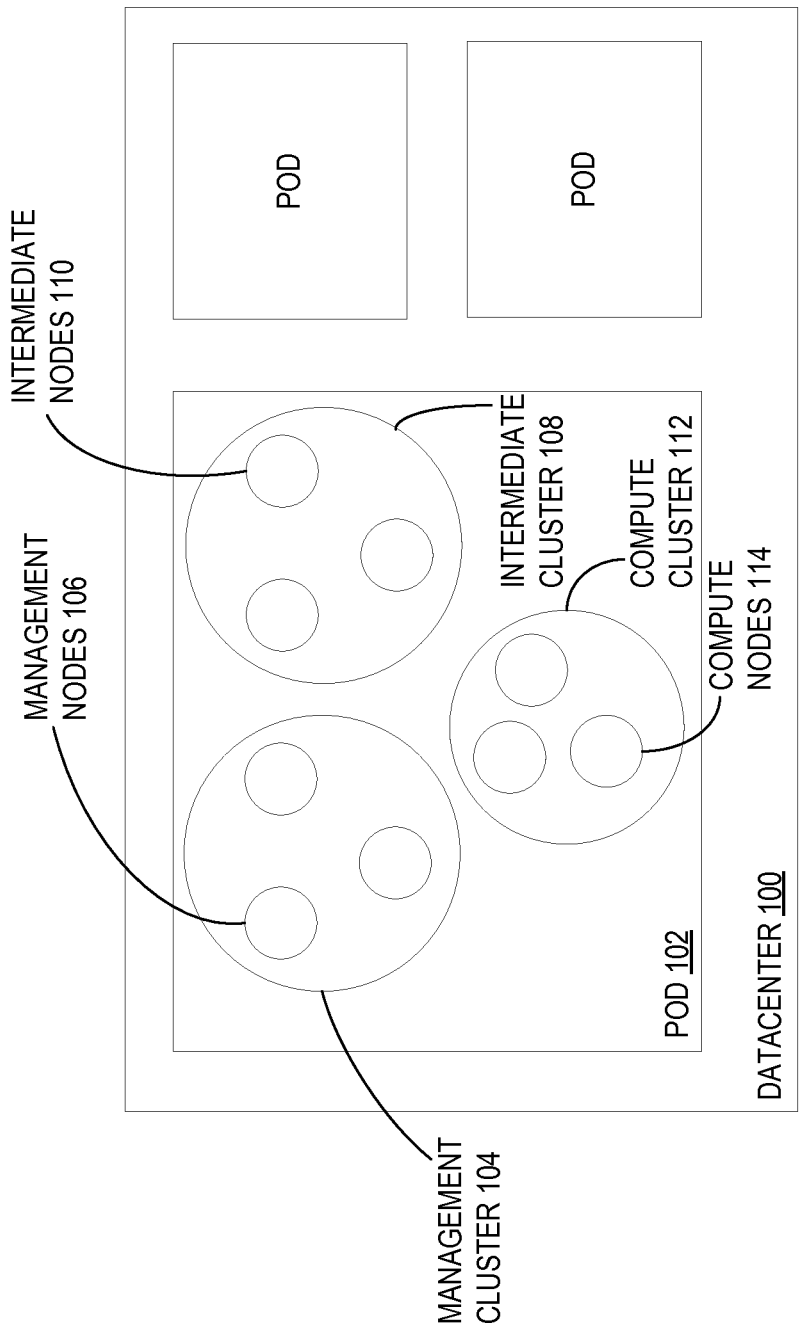
FIG. 1 is a block diagram of an exemplary architecture for performing concurrent execution of distributed workflows sharing common operations.

Examples of the disclosure include a scalable system capable of performing multiple, potentially conflicting operations on multiple objects such as virtual machines (VMs), simultaneously or near-simultaneously. The operations may be associated with any function.

In some examples, such as disaster recovery, a group of objects such as VMs is associated with a recovery plan. The disclosed system is a highly scalable service capable of performing multiple workflows on different recovery plans concurrently. These recovery plans may share the recoverable objects (e.g., VMs), so it is possible for two plans to attempt the same operation on the same object, from which only the first attempt to perform the operation succeeds.

The group of objects described above is, in some examples, not static or permanent. In that example, the group of objects is not required to be associated with a recovery plan. In some examples, a group of objects is created on demand to run a specific workflow, not associated with a recovery plan. In that example, once the workflow is done the grouping is discarded. If the workflow fails, then the user, in some examples, reruns the same workflow for the same group of objects similar to rerunning a recovery plan. In alternative examples, a recovery plan is created just to run a workflow, then discarded.

However, the failure of a particular operation does not always mean that recovery (or other type of workflow or operation) is not possible. Under some conditions, the failure may be ignored for the purposes of the given workflow. For example, if the workflow was initiated by the same recovery plan as a previous workflow, this is considered a re-run of the same workflow. In this example, the system ignores the failure and continues with the workflow operations, optionally skipping already completed operations.

If the workflow was initiated by a different recovery plan, the error was likely caused by concurrent execution of the two plans. In this example, the VM may have been recovered successfully, but with different settings. The disclosed system skips the remaining operations, in the recovery plan that encountered the error, for this VM and displays a warning to the user, because a positive outcome is not guaranteed. However, the workflow execution is still considered successful. If the initiator of the workflow is not recognized, the workflow fails.

One or more examples orchestrate a plurality of objects such as VMs during workflows. Site Recovery Manager Air (SRM Air) by VMware, Inc., is an example of the disclosed system. One example of a workflow managed by the present system is disaster recovery from the on-premises datacenter to the cloud and back. The disclosed system runs in the cloud, for example vCloud Air, by VMware, Inc., and allows customers to use the cloud-based datacenter as a disaster recovery site. In another example, the coordinated workflow is migration, planned failover, disaster recovery, forced failover, test cleanup, reprotect, test failover, deactivate, or reverse replication from one datacenter to another. For example, vSphere Replication to the Cloud, by VMware, Inc., may provide the replication technology for replicating running VMs to and from the cloud. However, aspects of the disclosure are not limited to disaster recovery, or any specific product or implementation.

Examples described herein attempt to execute sequences of operation across multiple nodes simultaneously, or near simultaneously. If an operation fails on a node, the individual node evaluates the failure, in some examples, and based on the evaluation attempts to execute the remaining operations, or aborts the remaining operations. All of the nodes report their results.

Aspects of the disclosure further enable increasing speed in executing concurrent workflows across distributed nodes. Under the disclosed method, operations which are initiated by the same source, and previously performed are not re-performed. This frees up processing resources for the execution of operations which have not yet been performed. This aspect of the disclosure also reduces the processor load. Because fewer extraneous operations are executed, the load on the processor is reduced, freeing the processor to perform other operations.

FIG. 1 is a block diagram of an exemplary architecture for performing concurrent execution of distributed workflows sharing common operations. The workloads are, in some examples, performed by objects associated with an on-premises or cloud-based datacenter 100, backed by physical computing resources. The exemplary architecture is a datacenter 100 split into multiple pods 102. Each pod 102 contains a number of clusters. In the illustrated example, there are three clusters: a compute cluster 112, a management cluster 104, and an intermediate cluster 108.

Each cluster is populated by a plurality of nodes. The management cluster 104 contains a plurality of management nodes 106. In some examples, the management nodes are SRM Air nodes, by VMware, Inc. The management nodes 106 manage, in some examples, disaster recovery applications. Although in the example of FIG. 1 the management nodes 106 are located on the pod 102, in other examples the management nodes 104 are not located on the pod 102. Each management cluster 104 is, in some examples, backed by a database cluster containing multiple nodes. The compute cluster 112 contains several compute nodes 114. Compute nodes 114 are described in some examples as compute management nodes. In some examples, the compute cluster 112 also contains a compute server, such as the vSphere Replication Management Server (VRMS) by VMware, Inc., which manages replication to and from the datacenter 100. The pod 102 also contains intermediate clusters 108, which contain a plurality of intermediate nodes 110 such as vSphere Replication Service (VRCS) or vCloud Director (VCD) cells, by VMware, Inc. The intermediate nodes 110, in some examples, are not necessary. In other examples, the intermediate nodes 110 are cloud service provider nodes. In some examples the management node 106 calls into the intermediate node 110 which in turn calls into the compute node 114 which ensures that the operations are performed to recover the objects.

In some examples, the intermediate nodes 110 disseminate workflow operations to the compute cluster 112. Within the compute cluster 112, the individual workflow operations 208 are executed by a compute node 114. The compute nodes 114, in some examples, transmit responses or reports back to the intermediate nodes 110 or to the intermediate clusters 108. In some examples, the responses indicate that a workflow operation 208 is successfully completed by the compute node 114, that the workflow operation was previously initiated, an error, or other warning. All servers and infrastructure components in a pod 102 are shared among all nodes, objects, or tenants assigned to this pod 102. Each pod 102 is, in some examples, designed to handle hundreds of tenants running thousands of VMs simultaneously.

Figure 2:
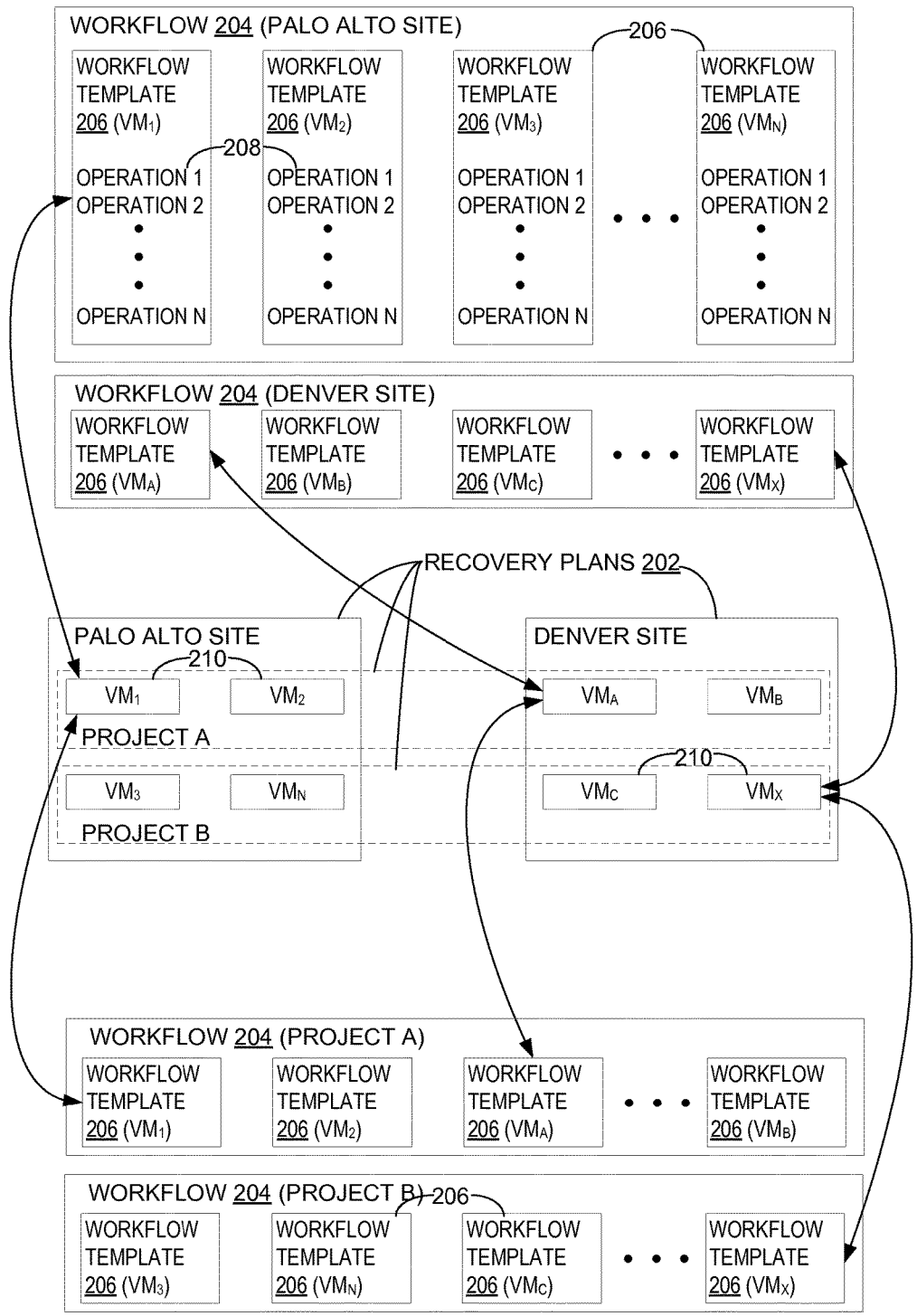
FIG. 2 is a block diagram of an exemplary architecture of recovery plans and their associated virtual machines (VMs), objects, or state machines.

FIG. 2 is a block diagram of an exemplary architecture of recovery plans 202 and their associated VMs 210, objects, state machines, etc. A recovery plan 202 includes, in some examples, several objects, in this example VMs 210. In some examples, the recovery plan 202 also includes configuration information for the objects. The sequence of operations 208 that is performed for a single object during a workflow is the "workflow template" 206. A workflow 204 is the sequence of operations 208 executed for all objects in the recovery plan 202. One example of a workflow 204 is a "reprotect workflow" which reverses the protection and replication direction for all VMs 210 associated with the recovery plan 202. In some examples, for each object or VM 210 associated with the recovery plan 202 the same sequence of operations 208 is executed. In other examples, different sequences of operations 208 are executed for different objects or VMs 210 associated with the recovery plan 202. In some examples, the workflow template 206 is a sequence of operations 208 to recover a single VM 210. In some examples, each object, VM 210, etc. associated with a workflow template 206 is a state machine. Performing or executing the sequence of operations 208, in order, in the workflow template 206, serves to restore the VM 210, object, etc. to the desired state. Any VM 210 belongs, in some examples, to multiple recovery plans 202.

However, only one recovery plan 202 recovers the VM 210, others skip the appropriate recovery operations and consider the VM 210 as successfully recovered. The relationship of VMs 210 to workflow templates 206 is not always one to one. In one example, a VM 210 is associated with a recovery plan based on the location of its physical resources (e.g., all VMs 210 sharing the same underlying hardware are associated with one recovery plan) and the same VM 210 is associated with a recovery plan based on its project association (e.g., all VMs 210 sharing related tasks). In another example, multiple recovery plans are used in hierarchical recovery. Specifically, one recovery plan recovers all VMs 210 in a datacenter, one recovery plan recovers a particular cluster, one recovery plan recovers a particular application, etc.

FIG. 2 is one illustration of the above-described example. A plurality of VMs 210 is associated with multiple projects (e.g., Project A and Project B) and multiple sites (e.g., Palo Alto and Denver). In FIG. 2, $VM_1$ 210, $VM_2$ 210, and $VM_3$ 210 through $VM_N$ 210 are all operating in Palo Alto. $VM_A$ 210, $VM_B$ 210, and $VM_C$ 210, through $VM_X$ 210 are all operating in Denver. However, despite their geographic associations, $VM_1$ 210, $VM_2$ 210, $VM_A$ 210, and $VM_B$ 210 are all associated with Project A, and $VM_3$ 210, $VM_N$ 210, $VM_C$ 210, and $VM_X$ 210 are all associated with Project B. In the example of FIG. 2, there are multiple recovery plans (four are illustrated in FIG. 2). The recovery plans organize VMs 210 based on their geographic associations and based on the project association of the VMs 210.

In the example of FIG. 2, the associations of $VM_1$ 210, $VM_A$ 210, and $VM_X$ 210 are illustrated with arrows connecting those VMs 210 with their associated workflow templates 206. Specifically, $VM_1$ 210 is associated with the workflow template 206 included in the workflow 204 specified for Palo Alto VMs 210; however, $VM_1$ 210 is also associated with the workflow template 206 included in the workflow 204 specified for Project A VMs 210. The associations for $VM_A$ 210 and $VM_X$ 210 are also illustrated by arrows. While not similarly illustrated, each other VM 210 is associated with a workflow 204 based on its geographic association, and its project association.

Although the above example and FIG. 2 are drawn to geographic and project-based associations, VMs 210 or other objects are grouped, in other examples, in a plurality of other ways. Recovery plans 202 are, in other examples, created based on resource allocation, tasks, users, mechanical constraints, backup schedules, etc. Further, a VM 210 or other object is, in some examples, only associated with one recovery plan 202, or any combination of recovery plans 202.

Figure 3:
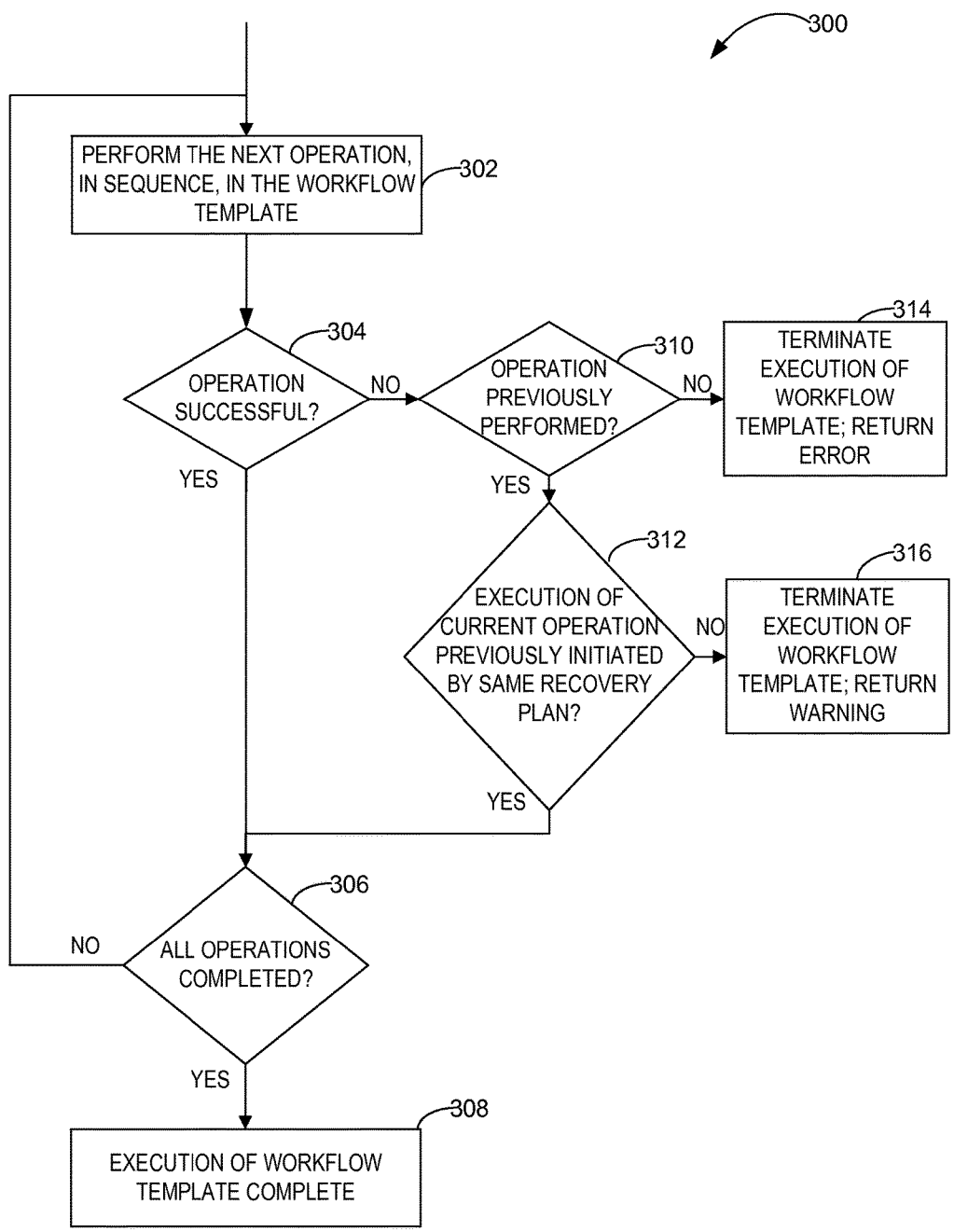
FIG. 3 is a block diagram of an exemplary method for scalable concurrent execution of distributed workflows sharing common operations as performed by a management node.

FIG. 3 is a block diagram of an exemplary method for scalable concurrent execution of distributed workflows sharing common operations as performed by a management node 106. Although FIG. 3, and the description below, are addressed to a single management node 106, the disclosed system and method contemplates the plurality of management nodes 106 in the management cluster 104 performing the method, simultaneously, nearly simultaneously, in parallel, or concurrently. In some examples, such as if resources are limited, the method is performed sequentially. Simultaneously or nearly simultaneously, in some examples, includes operations performed within a particular quantity of clock cycles, seconds, or as soon as processing resources become available. A more detailed exemplary method for scalable concurrent execution of distributed workflows sharing common operations as performed by a management node 106 is illustrated and described in FIG. 5.

At 302, an individual management node 106 begins to perform the next operation 208 associated with the workflow template 206 of that VM 210. If, at 304, the operation 208 is successfully performed, then the management node 106 continues to perform all of the operations 208 in the sequence at 306 until execution of the workflow template 206 is completed at 308.

However, if the operation 208 is not successfully completed at 304, the management node 106 at 310 evaluates whether the operation 208 had previously been performed. In some examples, the operation is previously performed if the initiation of the workflow 204 is a re-run, if the management node 106 failed before completing the workflow template 206, or if a message indicating that the intermediate node 110 completed the workflow operation 206 was not received by the management node 106 which initiated the workflow 204. If the operation 208 was indicated as previously performed, the management node 106 determines if the previous execution of the current operation was performed by the same recovery plan at 312. If the previous execution of the current operation was performed by the same recovery plan, the management node 106 continues to perform the operations 208 in the sequence at 306 until the execution of the workflow template 206 is complete at 308.

If, at 310, the management node 106 discovers that the operation 208 was not successful (evaluated at 304) and also that the operation 208 was not previously performed, the execution of the workflow template 206 is terminated, and the management node 106 returns an error to the user 908.

In some examples (not illustrated), if a recovery plan workflow fails, the user 908 does not rerun the same workflow. In some examples where the recovery plan workflow fails, the user 908 runs a different workflow what would perform a similar function and would perform similar operations for the same object or other VM 210. For example, if the user 908 started a planned failover workflow and then half way through it fails for a VM 210, the user 908 may determine that he no longer cares about the protected site and runs a forced failover workflow for the same recovery plan, instead. In that example, for the forced failover workflow, only operations at the recovery site (create failover image, power-on, customize, etc.) would be performed, but not the operations at the protected site (sync, power-off, etc.). If the planned failover failed at one of the steps that are shared with the forced failover, the forced failover workflow, in that example, picks up where planed failover left off and continues.

However, if the management node 106 discovers that the operation 208 was not successful (evaluated at 304) and also that the operation 208 was previously performed at 310, then the management node 106 evaluates if the previous execution of the current operation was performed by the same recovery plan at 312. If the previous execution of the current operation was performed by the same recovery plan at 312, then the management node 106 returns to the decision loop illustrated in blocks 306, 302, and 304 and described above.

At 312, when evaluating whether the current execution of the current operation was performed by the same recovery plan 202 as the previous execution of the current operation, if the management node 106 determines that the two recovery plans are not the same, then the execution of the current workflow template 206 is terminated by the management node 106 at 316. Upon terminating the execution of the current workflow template 206 at 316, the management node 106 also returns a warning to the user 908.

The above operations are performed by an individual management node 106. However, a plurality of management nodes 106, or a management cluster 104, simultaneously performs method 300, as described above. Method 300 is illustrated and discussed in more detail in FIG. 5.

Figure 4:
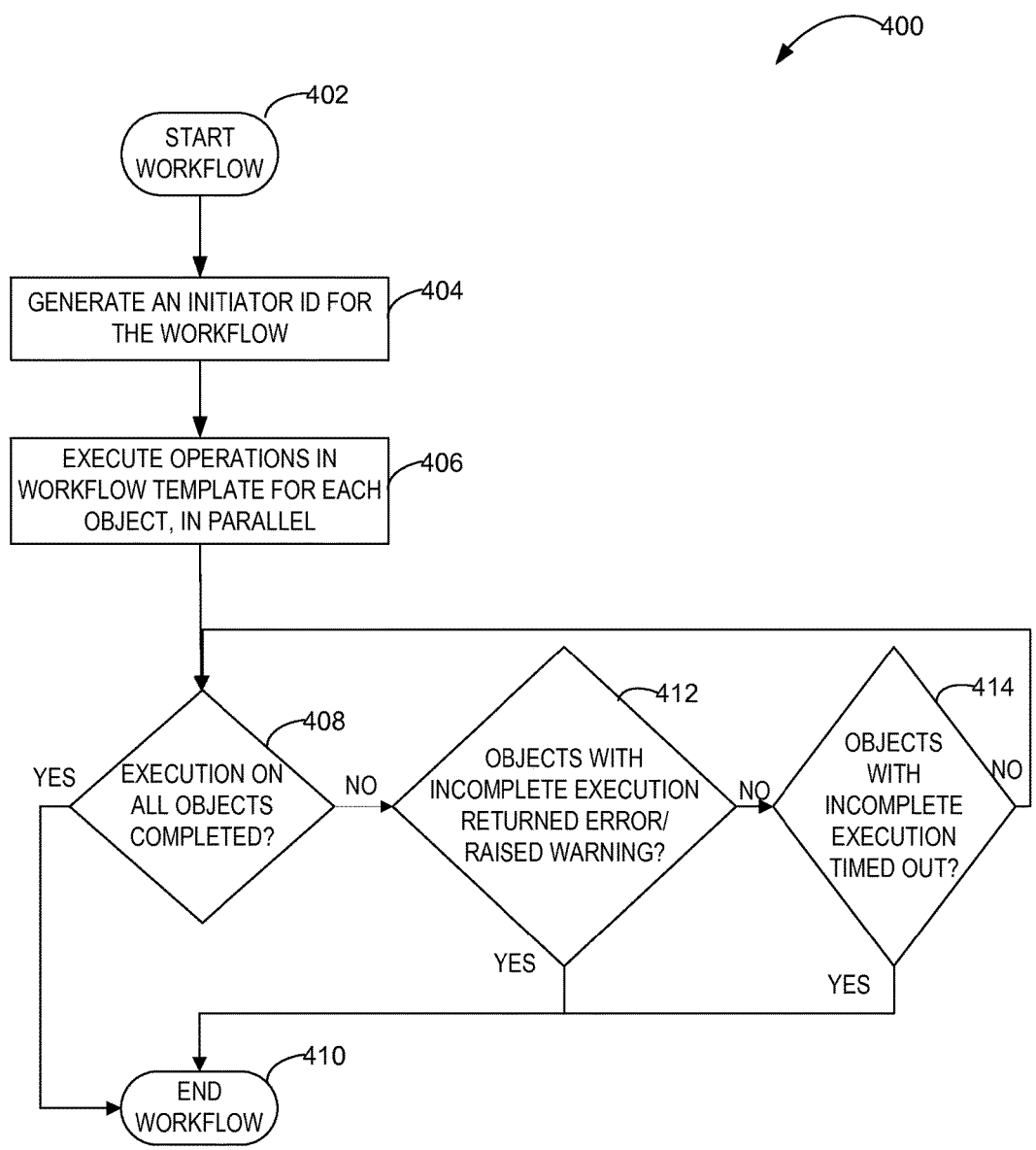
FIG. 4 is a block diagram of the exemplary role of a management node during scalable concurrent execution of distributed workflows sharing common operations as performed by management nodes.

FIG. 4 is a block diagram of the exemplary role of an management node 106 during scalable concurrent execution of distributed workflows sharing common operations as performed by management nodes 106. At 402, a workflow 204 is initiated. The workflow 204 is, in some examples, initiated automatically in response to an event. In other examples, the workflow 204 is initiated by a user 908. At 404, an Initiator ID is associated with the workflow 204. The Initiator ID is, in some examples, stored and retrieved via an API, in a database such as Zookeeper from Apache Software Foundation, or in some other logical storage system. The Initiator ID is, in some examples, a unique alphanumeric identifier indicating the source which initiated the workflow 204. The Initiator ID, in some examples, also includes an Execution ID (e.g., uniquely identifying the workflow execution among other workflow executions), a Recovery Plan ID (e.g., uniquely identifying the recovery plan among other recovery plans). In some examples (not illustrated) the Initiator ID also includes a Protected VM ID, which uniquely identifies the protected VM or VMs 210 among other VMs 210.

At 406 the management node 106 starts executing the operations 208 (in the order specified by the workflow template) for each object, in parallel (across all the objects). The operations illustrated in FIG. 5 are duplicated for each object.

If all of the objects report completion in executing their associated workflow templates 206 at 408 the workflow ends at 410. However, if not all objects have reported completion at 408, the workflow ascertains whether the objects which failed to report completion have returned an error, raised a warning, or made any other report at 412. If some report has been made by one of the objects failing to complete their associated workflow templates 206 at 412, then the workflow 204 ends. Otherwise, the workflow continues to wait for responses from the objects until the incomplete objects have timed out at 414. In some examples, the duration of the wait is defined by a user 908, a policy, or based on statistical averages of previous execution times for workflow templates 206. The wait time is, for example, defined as the average wait time plus one standard deviation. In examples where the wait time is defined by average historic wait times, the wait time is adjusted as additional information is accumulated. After all objects have reported completion, raised a warning, or returned an error, the workflow is ended at 410.

Figure 5:
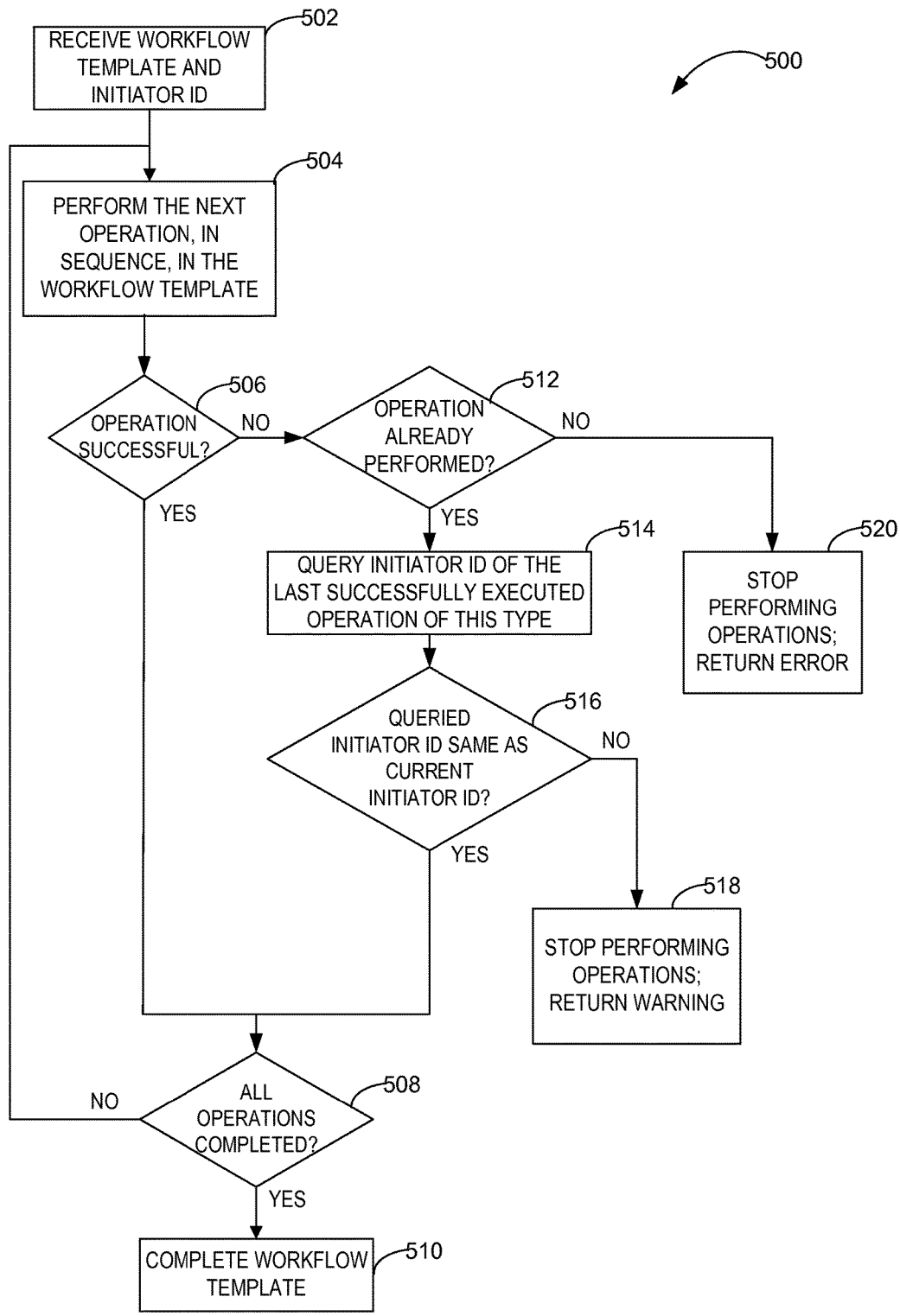
FIG. 5 is a detailed block diagram of the exemplary method for scalable concurrent execution of distributed workflows sharing common operations as performed by a management node, previously illustrated and described in FIG. 3.

FIG. 5 is a more detailed block diagram of the exemplary method for scalable concurrent execution of distributed workflows 204 sharing common operations as performed by a management node 106, previously illustrated and described in FIG. 3. The operations illustrated in FIG. 5 are performed by multiple management nodes 106 simultaneously, or as near to simultaneously as system constraints and user limits allow.

At 502, the management node 106 receives its workflow template 206 from the user 908 and the Initiator ID for the workflow 204. At 504, the management node 106 instructs the intermediate node 108 to perform the next operation 208 in the workflow template 206. The current Initiator ID is passed to the intermediate node 108 together with the command request. The intermediate node 108 instructs the compute node 112 to perform the operation 208, passing the Initiator ID together with the operation request. If the operation 208 has not been previously performed for the object, the compute node performs the operation and stores the Initiator ID. If the operation 208 is successfully performed at 506, the management node 106 continues to execute the next operation 208 in the sequence of operations in the workflow template 206 until all operations 208 in the workflow template 206 are completed at 508. Once all of the operations 208 are completed, the management node 106 completes the workflow template 206, and in some examples sends a report to the user 908 reporting that it has completed the requested workflow template 206.

However, if at 506 an operation is not successfully performed, the management node 106 determines whether the operation 208 was previously performed at 512. If at 512 the management node 106 determines that the operation 208 which failed at 506 was not already performed, then the management node 106 stops performing operations 208 in the workflow template 206, and returns an error. Alternatively, if the operation 208 was previously performed, at 514 the management node 106 queries the Initiator ID associated with the last successful execution of that operation 208. The Initiator IDs are, in some examples, stored in a database (e.g., Zookeeper from Apache Software Foundation), table, via an API, or any other logical storage system. If the recovery plans that initiated the previous and the current execution of the operation 208 are the same, then the workflow 204 is a re-run of the same workflow template 206 for the same recovery plan 202. The management node 106 verifies that all operations 208 in the workflow template 206 are completed at 508, completes any unexecuted operations 208 in the workflow template 206, and subsequently completes the workflow template 206 at 510.

Alternatively, if at 516 the recovery plan that initiated the previous execution of the operation does not match the recovery plan of the current execution of the operation 208, then the remaining operations 208 in the workflow template 206 are not performed, and a warning is returned to the user 908 at 518.

In some examples, it is possible for two recovery plans 202 to attempt the same operation 208 on the same underlying object. In that example, only the first attempt to perform the operation 208 succeeds. However, the failure of the other attempt to perform a particular operation 208 does not always mean that the other recovery plan 202 (or other type of workflow 204) requested on the management node 106 ends with failure. Under some conditions, the failure to perform the operation is ignored for the purposes of the given workflow 204.

Figure 6:
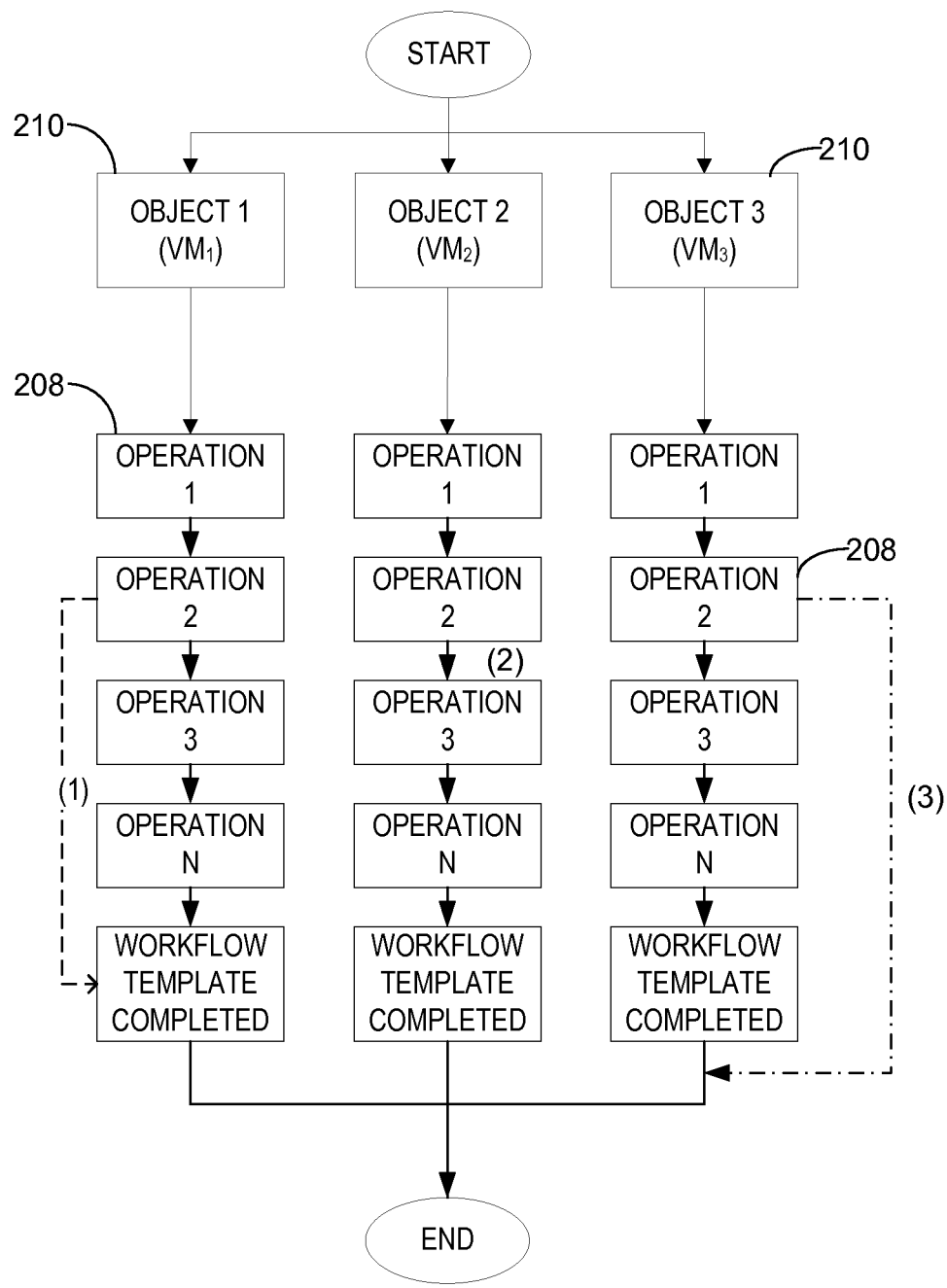
FIG. 6 is a block workflow diagram of execution of workflow operations on three objects, as performed by the disclosed exemplary architecture illustrated in FIGS. 1 and 2.
Figure 7:
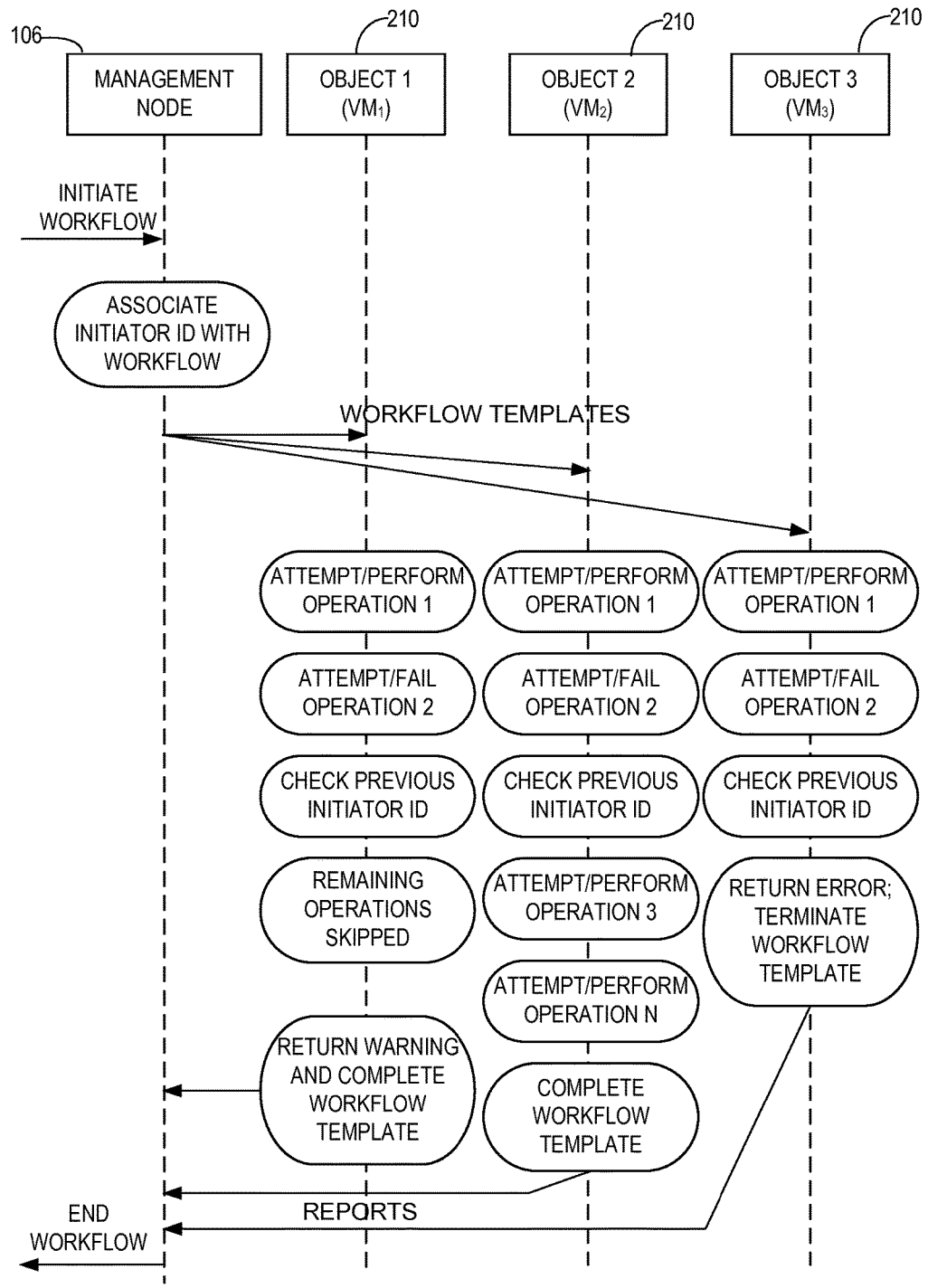
FIG. 7 is a sequence diagram of an exemplary sequence of operations during the scalable concurrent execution of distributed workflows sharing common operations.

FIG. 6 is a block workflow diagram of three objects (e.g., VMs 210) performing workflow templates 206, as performed by the disclosed exemplary architecture illustrated in FIGS. 1 and 2. In the example of FIG. 7, all three objects receive workflow templates 206 from a management node 106. Although the operations are described as performed by the objects, it is understood that in some examples, the management node 106 executes the workflow, while the compute nodes, intermediate nodes, or other components perform the individual operations upon the objects to achieve the desired state.

Object 1 performs operation 1 208. Upon attempting to perform operation 2 208, object 1 discovers operation 2 208 is already done by another recovery plan. Consequently, object 1 skips the subsequent operations 208 and produces a warning.

Object 2 performs operation 1 208. Upon attempting to perform operation 2 208, the operation 208 succeeds, or object 2 discovers operation 2 208 was completed earlier by the same recovery plan. This is a re-run, and management node 2 106 continues to execute the subsequent operations 208.

Object 3 performs operation 1 208. Upon attempting to perform operation 2 208, the operation 208 fails, and object 3 determines that operation 2 208 was not performed previously. In this case, object 3 returns an error.

FIG. 7 is a sequence diagram of an exemplary sequence of operations during the scalable concurrent execution of distributed workflows sharing common operations. The exemplary sequence illustrated in FIG. 7 corresponds to the exemplary workflow diagram illustrated in FIG. 6.

The sequence begins when the workflow is initiated. In some examples, the management node 106 initiates the workflow 204. In other examples, the workflow 204 is initiated from outside the management node 106. The management node 106 associates an Initiator ID with the workflow 204, and executes the workflow templates 206, upon each object, in this example a VM 210. The objects upon which the workflow templates are executed are, in some examples, state machines. Although the operations are described as performed by the objects, it is understood that in some examples, the management node executes the workflow, while the compute nodes, intermediate nodes, or other components perform the individual operations upon the objects to achieve the desired state. In the example of FIG. 7, each object attempts, and successfully performs operation 1 208.

Object 1 attempts to perform operation 2 208, and it fails to do so. Upon failing to perform operation 2 208, the management node 106 evaluates whether operation 2 208 was previously performed, and if so which recovery plan 202 had previously performed the operation 208 (e.g. by evaluating the Initiator ID of the execution of the operation). The management node 106 discovers that operation 2 208 was previously performed, and initiated by a different recovery plan 202. Object 1 skips the subsequent operations 208, completes the workflow template 206 with a warning, and the management node 106 reports completion of the workflow template 206 to the user 908 with a warning.

Object 2 attempts to perform operation 2 208, and it fails to do so. Upon failing to perform operation 2 208, the management node 106 evaluates whether operation 2 208 was previously performed, and if so which recovery plan 202 had previously performed the operation 208 (e.g. by evaluating the Initiator ID of the execution of the operation). The management node 106 discovers that operation 2 208 was previously performed by the same recovery plan 202. Consequently, this is a re-run of the recovery plan 202. Object 2 performs the remaining operations 208 in the workflow template 206 and completes the workflow template 206. The management node 106 reports successful completion of the workflow template 206 to the user 908.

Object 3 attempts to perform operation 2 208, and it fails to do so. Upon failing to perform operation 2 208, the management node 106 evaluates whether operation 2 208 was previously performed, and if so which recovery plan 202 had previously performed the operation 208 (e.g. by evaluating the Initiator ID of the execution of the operation). The management node 106 discovers that operation 2 208 was not previously performed. Consequently, the execution of operation 2 208 failed for some reason other than having been already performed. The management node 106 terminates the workflow template 206, and reports an error to the user 908.

Upon receiving the reports from all the objects that the workflow templates 206 are completed or terminated, the management node 106 ends the workflow 204. In some examples, ending the workflow 204 involves reporting results to another object or user 908 which initiated the workflow 204.

Figure 8A:
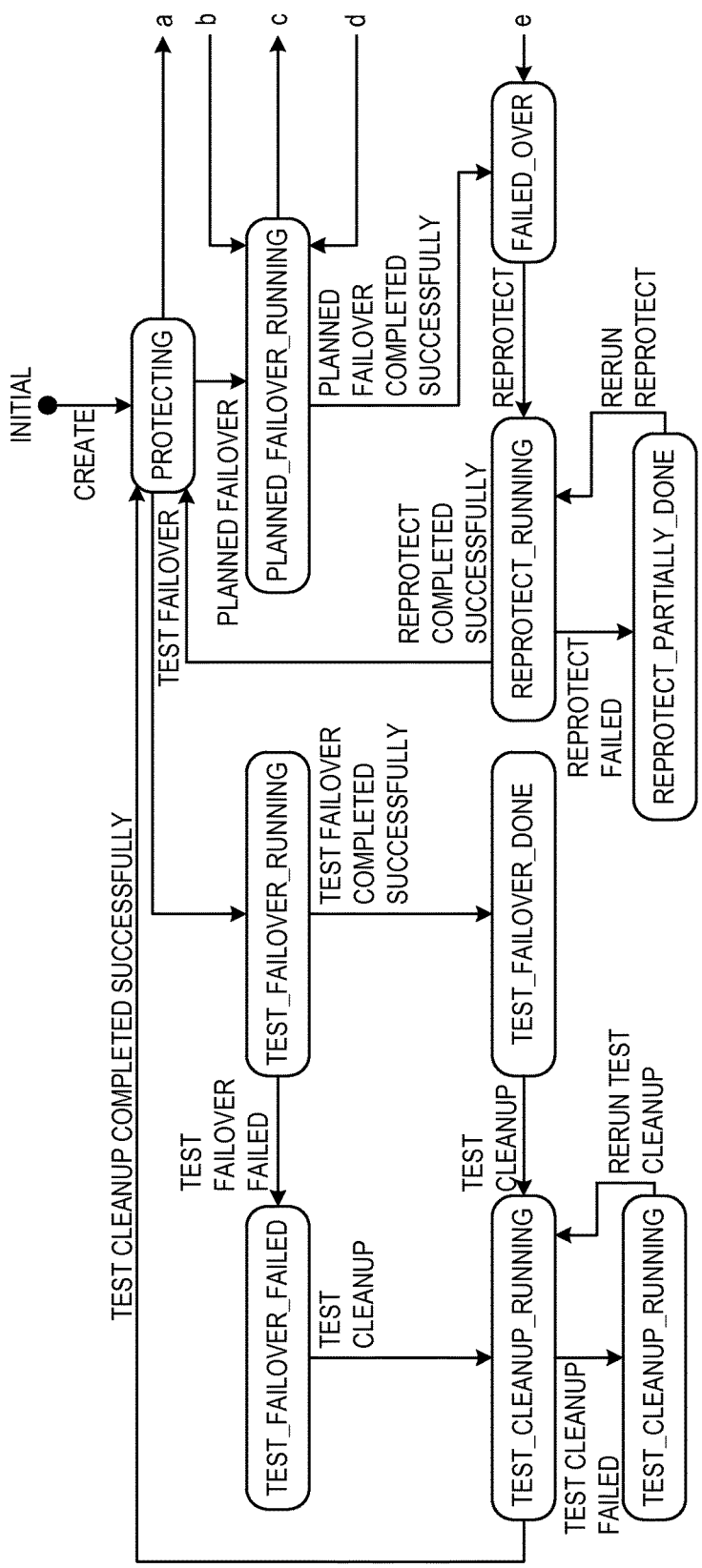
FIGS. 8A and 8B are state transition diagrams for allowed state of recovery plans as management nodes perform the operations in a workflow template.
Figure 8B:
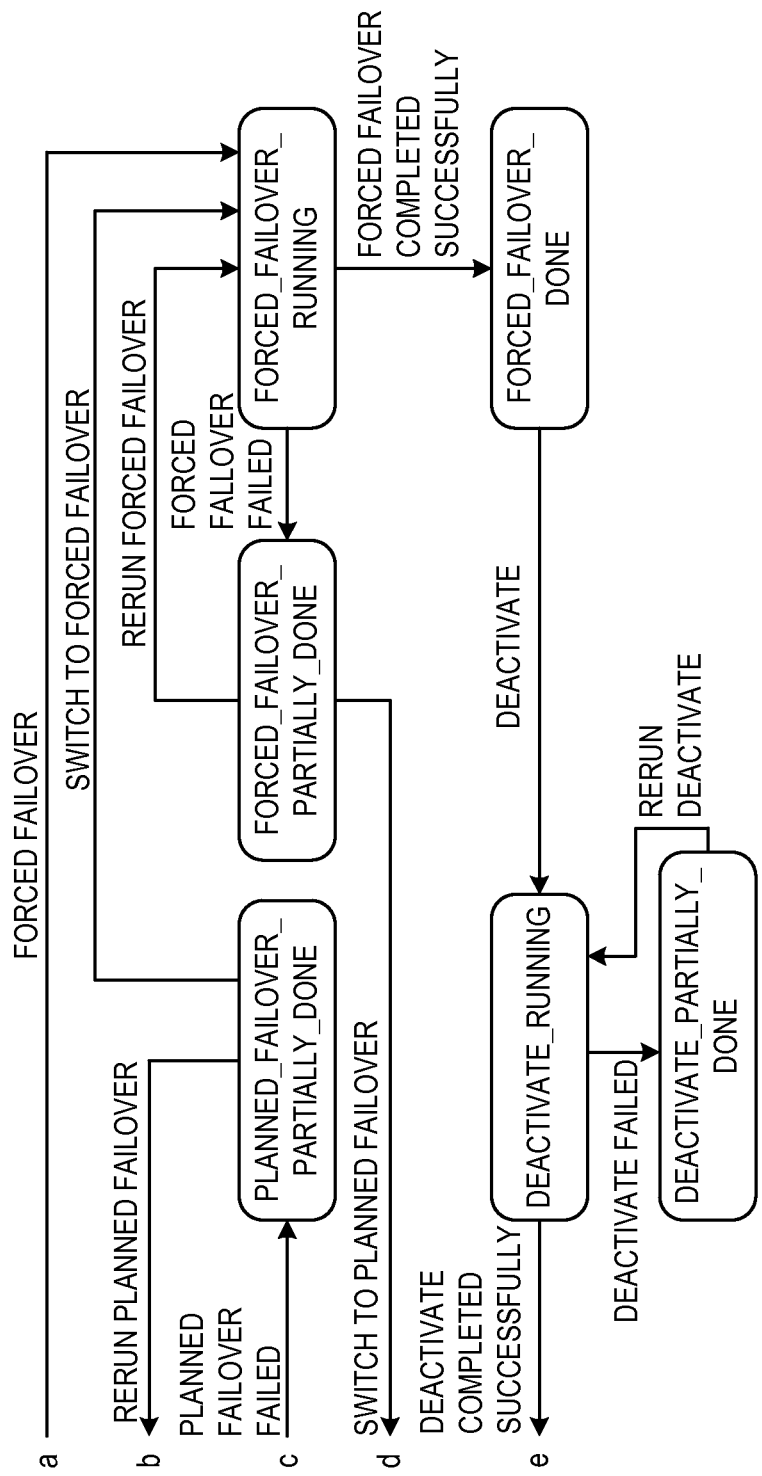

FIGS. 8A and 8B are examples of state transition diagrams for allowed state of a recovery plan 202 as management nodes 106 perform the operations in a workflow template 206. Various scenarios are illustrated. For example, state transitions for execution of workflow templates for planned failover, test failover, test cleanup, reruns, etc. are illustrated in FIGS. 8A and 8B.

Figure 9:
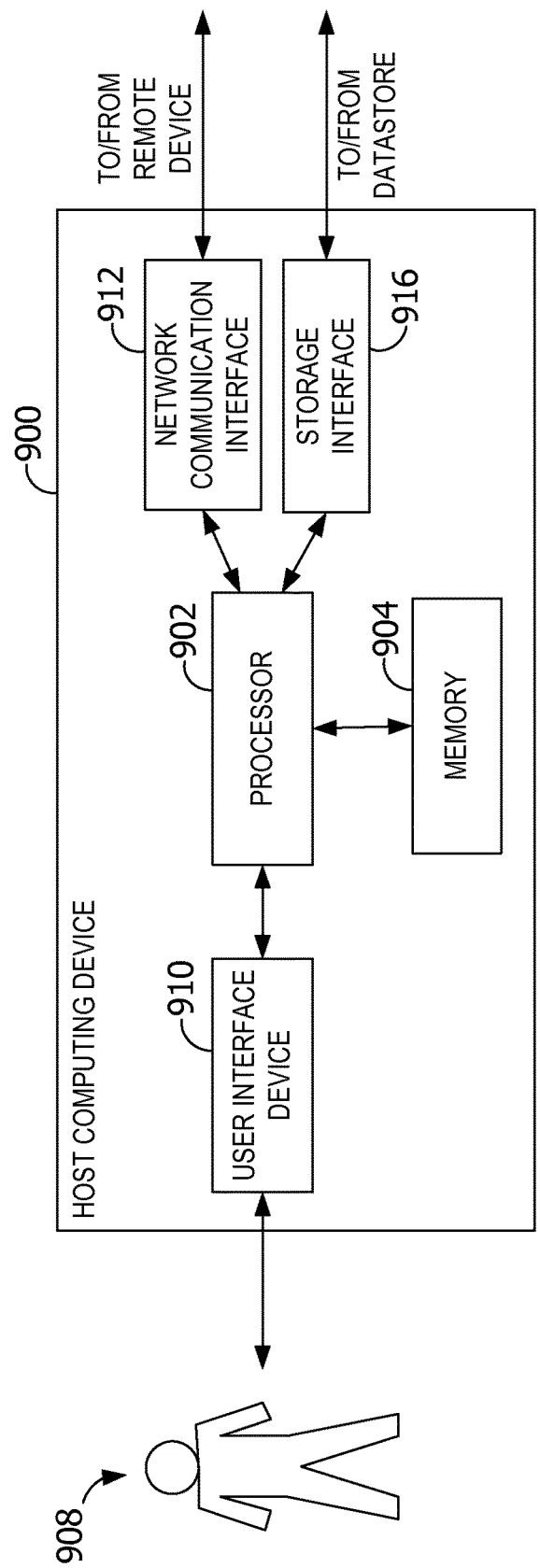
FIG. 9 is a block diagram of an example host computing device.

FIG. 9 is a block diagram of an example host computing device 900. Host computing device 900 includes a processor 902 for executing instructions. In some examples, executable instructions are stored in a memory device 904. Memory 904 is any device allowing information, such as executable instructions and/or other data, to be stored and retrieved. For example, memory 904 may include one or more random access memory (RAM) modules, flash memory modules, hard disks, solid state disks, and/or optical disks.

Host computing device 900 may include a user interface device 910 for receiving data from a user 908 and/or for presenting data to user 908. User 908 may interact indirectly with host computing device 900 via another computing device such as a device running VMware's vCenter Server or other management device. User interface device 910 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 910 operates to receive data from user 908, while another device (e.g., a presentation device) operates to present data to user 908. In other examples, user interface device 910 has a single component, such as a touch screen, that functions to both output data to user 908 and receive data from user 908. In such examples, user interface device 910 operates as a presentation device for presenting information to user 908. In such examples, user interface device 910 represents any component capable of conveying information to user 908. For example, user interface device 910 may include, without limitation, a display device (e.g., a liquid crystal display (LCD), organic light emitting diode (OLED) display, or "electronic ink" display) and/or an audio output device (e.g., a speaker or headphones). In some examples, user interface device 910 includes an output adapter, such as a video adapter and/or an audio adapter. An output adapter is operatively coupled to processor 902 and configured to be operatively coupled to an output device, such as a display device or an audio output device.

Host computing device 900 also includes a network communication interface 912, which enables host computing device 900 to communicate with a remote device (e.g., another computing device) via a communication medium, such as a wired or wireless packet network. For example, host computing device 900 may transmit and/or receive data via network communication interface 912. User interface device 910 and/or network communication interface 912 may be referred to collectively as an input interface and may be configured to receive information from user 908.

Host computing device 900 further includes a storage interface 916 that enables host computing device 900 to communicate with one or more storage devices, which store virtual disk images, software applications, and/or any other data suitable for use with the methods described herein. In examples, storage interface 916 couples host computing device 900 to a storage area network (SAN) (e.g., a Fibre Channel network) and/or to a network-attached storage (NAS) system (e.g., via a packet network). The storage interface 916 may be integrated with network communication interface 912.

Figure 10:
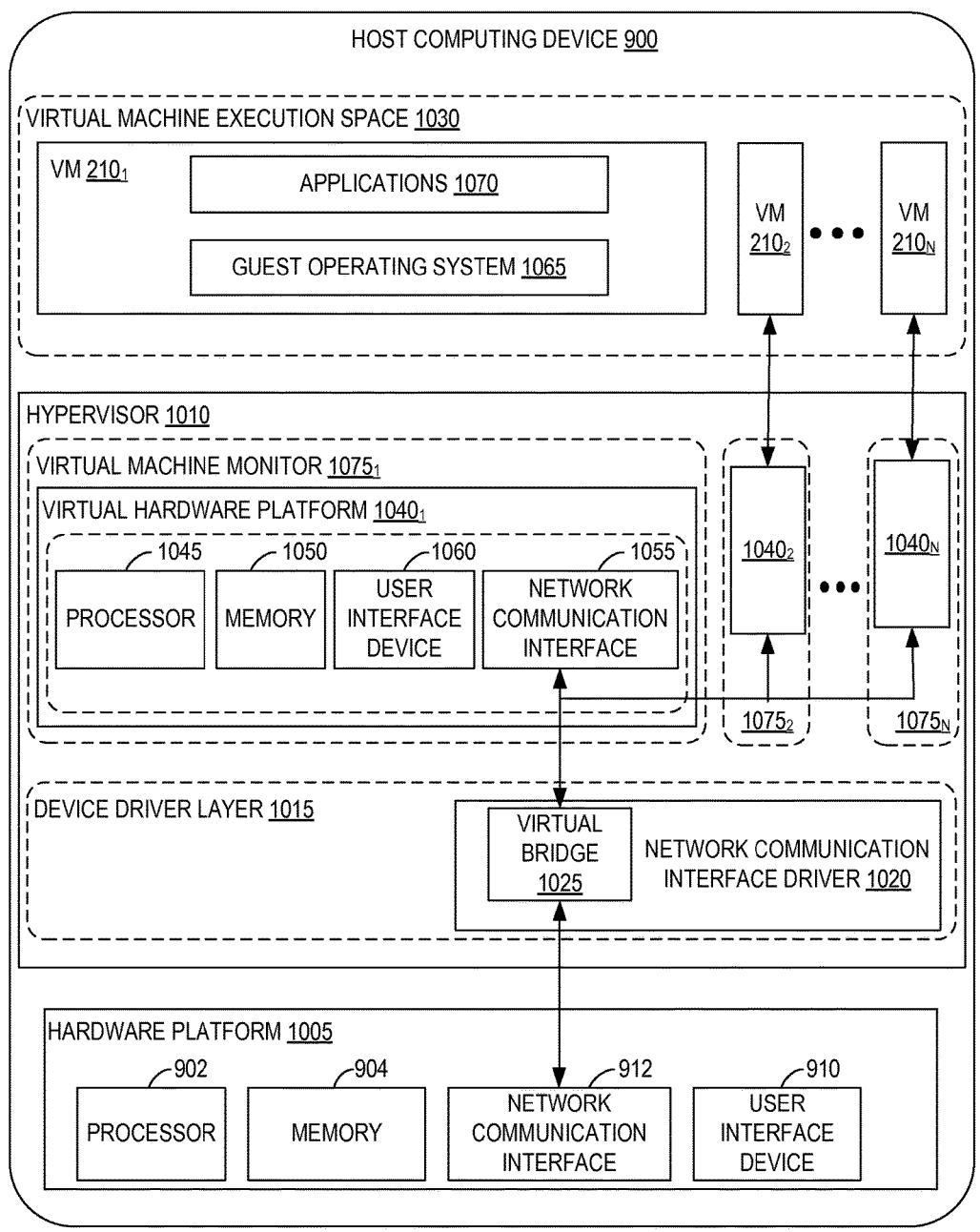
FIG. 10 depicts a block diagram of VMs that are instantiated on a host computing device.

FIG. 10 depicts a block diagram of virtual machines $210_1$, $210_2 \ldots 210_N$ that are instantiated on host computing device 900. Host computing device 900 includes a hardware platform 1005, such as an x86 architecture platform. Hardware platform 1005 may include processor 902, memory 904, network communication interface 912, user interface device 910, and other input/output (I/O) devices, such as a presentation device 906 (shown in FIG. 9). A virtualization software layer, also referred to hereinafter as a hypervisor 1010, is installed on top of hardware platform 1005.

The virtualization software layer supports a virtual machine execution space 1030 within which multiple virtual machines (VMs 210$_1$-210$_N$) may be concurrently instantiated and executed. Hypervisor 1010 includes a device driver layer 1015, and maps physical resources of hardware platform 1005 (e.g., processor 902, memory 904, network communication interface 912, and/or user interface device 910) to "virtual" resources of each of VMs 210$_1$-210$_N$ such that each of VMs 210$_1$-210$_N$ has its own virtual hardware platform (e.g., a corresponding one of virtual hardware platforms 1040$_1$-1040$_N$), each virtual hardware platform having its own emulated hardware (such as a processor 1045, a memory 1050, a network communication interface 1055, a user interface device 1060 and other emulated I/O devices in VM 210$_1$). Hypervisor 1010 may manage (e.g., monitor, initiate, and/or terminate) execution of VMs 210$_1$-210$_N$ according to policies associated with hypervisor 1010, such as a policy specifying that VMs 210$_1$-210$_N$ are to be automatically restarted upon unexpected termination and/or upon initialization of hypervisor 1010. In addition, or alternatively, hypervisor 1010 may manage execution VMs 210$_1$-210$_N$ based on requests received from a device other than host computing device 900. For example, hypervisor 1010 may receive an execution instruction specifying the initiation of execution of first VM 210$_1$ from a management device via network communication interface 912 and execute the execution instruction to initiate execution of first VM 210$_1$.

In some examples, memory 1050 in first virtual hardware platform 1040$_1$ includes a virtual disk that is associated with or "mapped to" one or more virtual disk images stored on a disk (e.g., a hard disk or solid state disk) of host computing device 900. The virtual disk image represents a file system (e.g., a hierarchy of directories and files) used by first VM 210$_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1015 includes, for example, a communication interface driver 1020 that interacts with network communication interface 912 to receive and transmit data from, for example, a local area network (LAN) connected to host computing device 900. Communication interface driver 1020 also includes a virtual bridge 1025 that simulates the broadcasting of data packets in a physical network received from one communication interface (e.g., network communication interface 912) to other communication interfaces (e.g., the virtual communication interfaces of VMs 210$_1$-210$_N$). Each virtual communication interface for each VM 210$_1$-210$_N$, such as network communication interface 1055 for first VM 210$_1$, may be assigned a unique virtual Media Access Control (MAC) address that enables virtual bridge 1025 to simulate the forwarding of incoming data packets from network communication interface 912. In an example, network communication interface 912 is an Ethernet adapter that is configured in "promiscuous mode" such that all Ethernet packets that it receives (rather than just Ethernet packets addressed to its own physical MAC address) are passed to virtual bridge 1025, which, in turn, is able to further forward the Ethernet packets to VMs 210$_1$-210$_N$. This configuration enables an Ethernet packet that has a virtual MAC address as its destination address to properly reach the VM in host computing device 900 with a virtual communication interface that corresponds to such virtual MAC address.

Virtual hardware platform 1040$_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1065 in order to execute applications 1070 for an instantiated VM, such as first VM 210$_1$. Virtual hardware platforms 1040$_1$-1040$_N$ may be considered to be part of virtual machine monitors (VMM) 1075$_1$-1075$_N$ that implement virtual system support to coordinate operations between hypervisor 1010 and corresponding VMs 210$_1$-210$_N$. Those with ordinary skill in the art will recognize that the various terms, layers, and categorizations used to describe the virtualization components in FIG. 10 may be referred to differently without departing from their functionality or the spirit or scope of the disclosure. For example, virtual hardware platforms 1040$_1$-1040$_N$ may also be considered to be separate from VMMs 1075$_1$-1075$_N$, and VMMs 1075$_1$-1075$_N$ may be considered to be separate from hypervisor 1010. One example of hypervisor 1010 that may be used in an example of the disclosure is included as a component in VMware's ESX brand software, which is commercially available from VMware, Inc.

Additional Examples

The following scenarios are merely exemplary and not intended to be limiting in any way.

In some examples, the recovery plan 202 is associated with a collection of VMs 210 replicated in the same direction. In another example, the recovery plan 202 is configured to reflect dependencies between VMs 210. Specific parameters are customized for each VM 210 to be used during execution of a workflow, assign scripts to each VM 210, etc. in an additional example. As an example, the recovery plan 202 is configured to execute recovery workflows 204 for the VMs 210. Specific workflow templates 206 include, in some examples, planned failover, forced failover, test failover etc. During the execution of a workflow 204 for a recovery plan 202, the disclosed method performs all the necessary operations for each VM 210 with as much parallelism as allowed by system constrains, the constraints configured by a user 908 (e.g., VM power-on dependencies and power-on priority tiers), unplanned events, etc. Executing a workflow 204 typically involves making multiple REST API calls to the intermediate nodes 110 and the compute nodes 114.

In other examples, an application crashes in the middle of the workflow 204 and subsequent workflow 204 re-run is performed. Because the disclosed system uses other services, it is possible for a crash to occur after external operations are initiated. In such cases, the disclosed system does not know that the operation may have succeeded and the system tries to execute the operation 208 again if the workflow 204 is re-run. Similar to a concurrent execution case, the second attempt fails, but the failure is ignored in some cases.

In some examples, the Initiator ID includes an execution ID, which makes them unique. If the user reruns the same (or different) workflow for the same recovery plan, initiators will be different because they would include different execution IDs. In this example, the decision whether to perform or skip steps is made based on the match of the recovery plans and not the full initiator IDs.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for concurrently executing distributed workflows sharing common operations. For example, the elements illustrated in FIGS. 1, 2, 6, 9, and/or 10, such as when encoded to perform the operations illustrated in FIGS. 3, 4, 5, 7, 8A, and/or 8B, constitute exemplary means for receiving, by one of a cluster of management nodes, one of a plurality of workflow templates, exemplary means for generating by a management node an Initiator ID associated with execution of the operations in the workflow and exemplary means for performing, by each management node in the cluster, the plurality of operations in the workflow template associated with the management node for the accessed at least one of the plurality of workflows.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system comprising:
   a memory area storing a plurality of recovery plans each including a plurality of workflows, each workflow in the plurality of workflows including a plurality of workflow templates, each workflow template in the plurality of workflow templates being associated with a sequence of operations;

a cluster of management nodes that, upon receiving at least one of the plurality of recovery plans and one of the plurality of workflow templates associated therewith, executes at least one of the plurality of workflows included in the at least one of the plurality of recovery plans without duplication of previously performed operations associated with other of the plurality of workflows by:
  generating an initiator identifier (ID) for each of the plurality of workflows, the initiator ID to be associated with every operation executed as part of respective workflow templates in the plurality of workflow templates;
  accessing, from the memory area, the at least one of the plurality of workflows and an initiator ID associated with a plurality of operations in the one of the plurality of workflow templates associated with the at least one of the plurality of workflows included in the received at least one of the plurality of recovery plans;
  performing the plurality of operations in the at least one of the plurality of workflow templates;
  storing the initiator ID associated with the plurality of operations;
  if an operation in the plurality of operations fails due to previous execution of the operation:
    comparing an initiator ID associated with the previous execution of the operation to the stored initiator ID; and
    based on determining a match between the initiator ID associated with the previous execution of the operation and the stored initiator ID, performing subsequent operations in the one of the plurality of workflow templates; and
    based on determining no match between initiator ID associated with the previous execution of the operation and the stored initiator ID, terminating performance of the one of the plurality of workflow templates.

2. The computing system of claim 1, wherein the plurality of workflows relates to at least one of a migration, planned failover, disaster recovery, forced failover, test cleanup, reprotect, test failover, deactivate, or reverse replication.

3. The computing system of claim 1, wherein the cluster of management nodes are defined as state machines.

4. The computing system of claim 1, wherein initiator IDs are stored in, and retrieved from, a logical storage system.

5. The computing system of claim 1, wherein initiator IDs are identifiers unique among each execution of a workflow from the plurality of workflows.

6. The computing system of claim 1, wherein initiator IDs comprise a recovery plan ID and one or more of an execution ID and a protected object ID.

7. The computing system of claim 1, wherein a processor associated with the cluster of management nodes assigns initiator IDs.

8. A method for performing concurrent execution of a plurality of distributed workflows, including a plurality of workflow templates, by a cluster of management nodes, the method comprising:
  receiving one of the plurality of workflow templates associated with one of the plurality of distributed workflows;
  generating an initiator identifier (ID) for the one of the plurality of distributed workflows, the initiator ID to be associated with every operation executed as part of the received one of the plurality of workflow templates;
  performing a plurality of operations in the received one of the plurality of workflow templates;
  storing the initiator ID associated with the plurality of operations;
  if an operation in the plurality of operations fails due to previous performance of the operation:
    comparing an initiator ID associated with the previous execution of the operation to the stored initiator ID;
    performing subsequent operations in the received one of the plurality of workflow templates based on a match between the initiator ID associated with the previous execution of the operation and the stored initiator ID; and
  terminating performance of the received one of the plurality of workflow templates based on no match between the initiator ID associated with the previous execution of the operation and the stored initiator ID.

9. The method of claim 8, wherein terminating the performance of the received one of the plurality of workflow templates comprises returning a warning to a user that initiated performance of the received one of the plurality of workflow templates.

10. The method of claim 8, wherein upon failure of the operation in the plurality of operations, if the operation was not previously performed, terminating the performance of the plurality of operations in the received one of the plurality of workflow templates and returning an error to the user that initiated the performance.

11. The method of claim 8, wherein comparing the initiator ID of the previous execution of the operation to the stored initiator ID comprises comparing the stored initiator ID to a previous initiator ID.

12. The method of claim 8, further comprising storing a unique identifier for a source of the received one of the plurality of workflow templates in a logical storage system.

13. The method of claim 8, wherein the plurality of operations in the received one of the plurality of workflow templates are performed sequentially.

14. The method of claim 8, wherein the plurality of operations are performed to return, to a desired state, at least one of an object, a management node, or a virtual machine.

15. The method of claim 8, wherein the plurality of operations in the received one of the plurality of workflow templates are performed by the cluster of management nodes simultaneously or in parallel.

16. The method of claim 8, further comprising:
  upon determining system or user constraints that prevent performance of the plurality of distributed workflow templates in parallel, performing the plurality of distributed workflow templates in series.

17. A non-transitory computer-readable medium including instructions that, when executed by a computing system, concurrently execute distributed workflows that include a plurality of workflow templates, by a cluster of management nodes by:
  receiving one of the plurality of workflow templates, each of the plurality of workflow templates associated with a sequence of operations;
  generating an initiator identifier (ID) for the one of the plurality of distributed workflows, the initiator ID to be associated with every operation executed as part of the received one of the plurality of workflow templates;
  performing a plurality of operations in the received one of the plurality of workflow templates;
  storing initiator ID associated with the plurality of operations;

if an operation in the plurality of operations fails due to previous performance of the operation:
    comparing an initiator ID associated with a previous execution of the operation to the stored initiator ID;
    performing subsequent operations in the received one of the plurality of workflow templates based on a match between the initiator ID associated with the previous execution of the operation and the stored initiator ID; and
    terminating performance of the received one of the plurality of workflow templates based on no match between the initiator ID associated with the previous execution of the operation and the stored initiator ID.

18. The non-transitory computer-readable medium of claim 17, wherein the cluster of management nodes execute the plurality of workflow templates simultaneously or nearly simultaneously.

19. The non-transitory computer-readable medium of claim 17, wherein the computer-executable instructions further cause the computing system to store and retrieve initiator IDs of previously transmitted workflows.

20. The non-transitory computer-readable medium of claim 17, wherein operations are performed by the cluster of management nodes to implement execution of recovery plans.

* * * * *